T. SALARI.
RESILIENT AUTOMOBILE TIRE.
APPLICATION FILED JAN. 23, 1918.
1,284,466.
Patented Nov. 12, 1918.
Fig. 2.
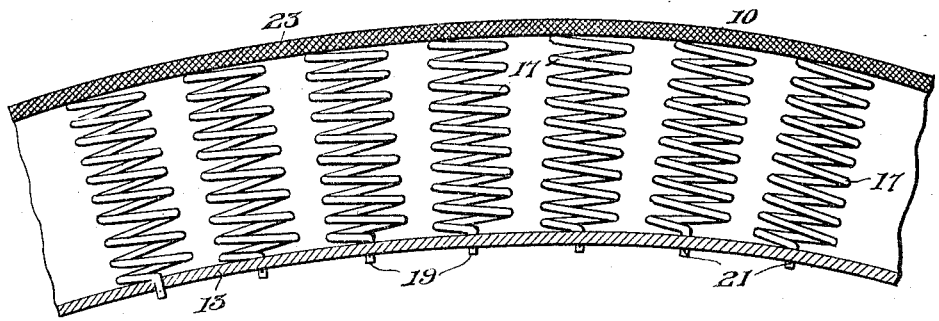
Fig. 1.
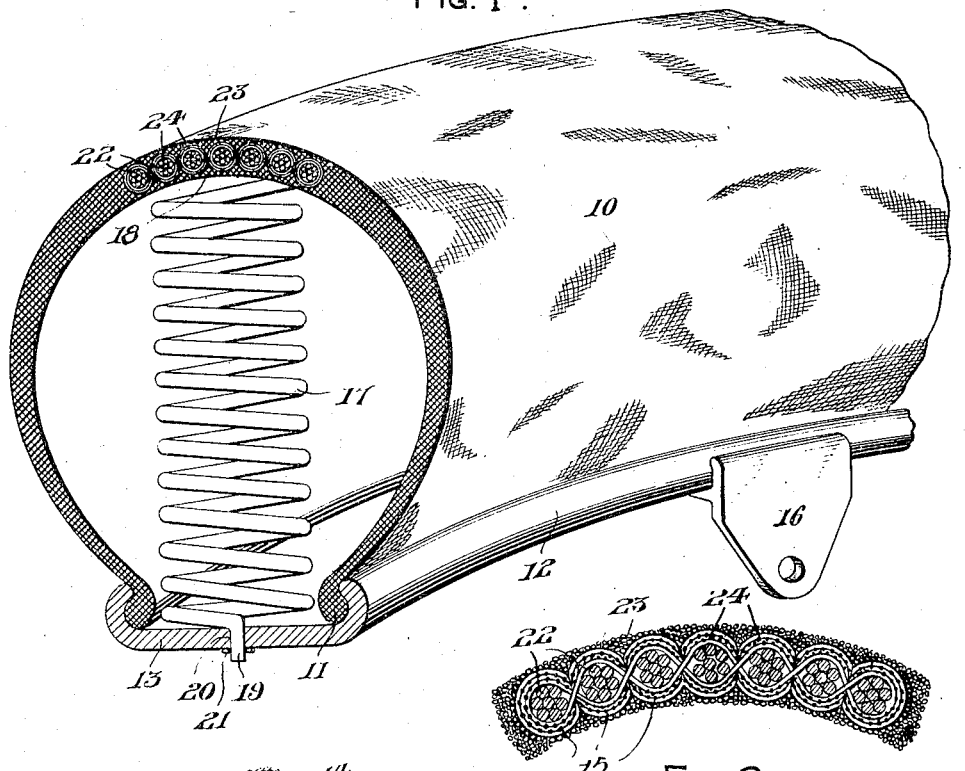
Fig. 3.
Fig. 4.
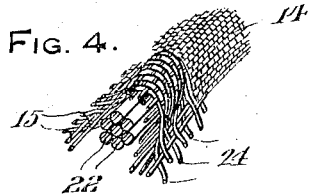
Inventor
T. Salari
By A. M. Wilson
Attorney

UNITED STATES PATENT OFFICE.

TONY SALARI, OF BISBEE, ARIZONA.

RESILIENT AUTOMOBILE-TIRE.

1,284,466.

Specification of Letters Patent. Patented Nov. 12, 1918.

Application filed January 23, 1918. Serial No. 213,351.

*To all whom it may concern:*

Be it known that I, TONY SALARI, a citizen of the United States of America, residing at Bisbee, in the county of Cochise and State of Arizona, have invented certain new and useful Improvements in Resilient Automobile-Tires, of which the following is a specification.

This invention relates to certain new and useful improvements in resilient automobile tires.

The primary object of the invention is the provision of a vehicle tire formed without the employment of rubber but possessing the required resiliency for employment upon the usual rim of a wheel, the device possessing great strength and durability.

A further object of the invention is the provision of a spring tire for vehicles that is readily mounted in a detachable manner upon the ordinary rim of a vehicle wheel, the device being quickly assembled and easily disassembled at will, while the structure is such that the puncturing of the tire will have no effect upon the same.

With these general objects in view and others that will become apparent as the nature of the invention is better understood, the same consists in the novel combination, construction and arrangement of parts hereinafter more fully described, illustrated in the accompanying drawing, and then claimed.

In the drawing forming a part of this application and in which like designating characters refer to corresponding parts throughout the several views, Figure 1 is a perspective view of a portion of a tire illustrating my invention.

Fig. 2 is a longitudinal sectional view thereof.

Fig. 3 is an enlarged transverse sectional view taken through the tread portion of the device, and Fig. 4 is a perspective view illustrating the woven wire body portion of the tire and the manner of arranging the tread members therein.

My device provides a tire shoe 10 formed of a body of wire mesh or fabric 14 in substantially the form of the ordinary shoe or casing of a pneumatic tire, the same being arranged with marginal beads 11 adapted for reception within the opposite flanges 12 of a clencher rim 13. It will be understood that the body of wire fabric 14 is formed of separate strands 15 woven together into a thick compact metallic fabric. Such a structure possesses great resiliency by reason of the flexibility of the wire strands 15 so that the tire 10 consists of a shoe which is sufficiently strong to maintain the weight of the load without flattening the tire but will give the proper resiliency thereto during travel.

The rim 13 is of the usual detachable form readily secured upon a wheel by a plurality of attaching clamps 16. The outer surface of the tire shoe 10 has the rough appearance of wire cloth or an ordinary screen and is serviceable in affording an anti-slipping surface for engaging the roadbed during the travel of the vehicle thereover.

Resilient inner members 17 are adapted for arrangement within the tire shoe 10, being preferably in the form of a plurality of helical springs radially mounted substantially centrally upon the rim 13 and engaging the central interior portion 18 of the tire shoe 10, which is the tread portion thereof. The springs 17 are arranged with angular ends 19 extending through perforations 20 of the rim 13 and retained in position by suitable cotter pins 21. The springs 17 assist to support the tread portion of the shoe 10, thereby adding to the strength of the tire as well as the shock absorbing qualities thereof when subjected to excessive loads.

Seven-strand cables 22 are preferably provided, seven in number, longitudinally extended through the tread portion 23 of the tire shoe 10, the said cables being intertwined and connected together by a plurality of wires 24 of a diameter intermediate that of the strands 15 and the wires forming the cables 22. The wire fabric 14 completely envelops the cables 22 and the surrounding wires 24 thereof forming a reinforced tread portion for the tire.

The cables 22 and wire 24 form a metallic tread member, slightly arcuate in cross section and arranged in annular formation, the same possessing flexibility both annularly and transversely and especially adapting the same for a reinforcing tread member for tires.

The reinforcing tread member is arranged within the tread portion 23 of the shoe 10 during the manufacture of the device, so that the complete structure consists of the metallic outer shoe 10 and the inner resilient members or springs 17. In assembling the device, the springs 17 are secured radially upon the rim 13 in the manner heretofore set forth and the shoe 10 is then positioned over the springs 17 and the beads 11 forcibly positioned inwardly of the flanges 12 of the rim 13 after the usual manner of attaching a pneumatic tire shoe or casing to a wheel rim. It will be understood that the tire shoe 10 may be employed with any form of rim, either a solid or split rim while such rim may be detachable from or fixed upon a wheel felly.

It will be seen that a serviceable tire is provided adapted for taking the place of rubber tires and being free from punctures and blowouts. This tire may be made of different weights and sizes for accommodating different sized wheels as well as loads and serviceable wherever a tire demanding great strength and durability is desirable.

What I claim as new is:—

A vehicle tire comprising a reinforcing annular tread member formed of parallel longitudinally arranged cables connected together by interwoven wires, and a wire fabric body enveloping the said tread member and arranged in the form of a tire shoe with spaced marginal attaching beads.

In testimony whereof I affix my signature.

TONY SALARI.

Copies of this patent may be obtained for five cents each, by addressing the "Commissioner of Patents, Washington, D. C."